United States Patent
Upadhyay et al.

(10) Patent No.: US 9,049,487 B2
(45) Date of Patent: Jun. 2, 2015

(54) COMMUNICATION METHOD AND SYSTEM FOR PROVIDING CONTENT TO A COMMUNICATION DEVICE ACCORDING TO A USER PREFERENCE

(71) Applicant: Sprint Communications Company L.P., Overland Park, KS (US)

(72) Inventors: Piyush Upadhyay, Overland Park, KS (US); Badri Prasad Subramanyan, Overland Park, KS (US); John W. Davis, Kansas City, MO (US); Ayodeji Abidogun, Overland Park, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 28 days.

(21) Appl. No.: 14/069,619

(22) Filed: Nov. 1, 2013

(65) Prior Publication Data
US 2014/0059607 A1    Feb. 27, 2014

Related U.S. Application Data

(63) Continuation of application No. 12/353,421, filed on Jan. 14, 2009, now Pat. No. 8,615,596.

(51) Int. Cl.
*G06F 15/16* (2006.01)
*H04N 21/4722* (2011.01)
*G06F 17/30* (2006.01)

(52) U.S. Cl.
CPC .......... *H04N 21/4722* (2013.01); *G06F 17/30* (2013.01)

(58) Field of Classification Search
USPC ......................................... 709/217, 221, 228
See application file for complete search history.

(56) References Cited

U.S. PATENT DOCUMENTS

| | | |
|---|---|---|
| 6,453,170 B1 | 9/2002 | List et al. |
| 6,771,302 B1 | 8/2004 | Nimri et al. |
| 6,931,151 B2 | 8/2005 | Weast |
| 6,985,524 B1 | 1/2006 | Borchers |
| 7,376,438 B2 | 5/2008 | Shiu et al. |
| 8,330,864 B2 | 12/2012 | Blumenschein et al. |
| 2003/0061317 A1 | 3/2003 | Brown et al. |
| 2003/0095705 A1 | 5/2003 | Weast |
| 2004/0011190 A1 | 1/2004 | Kawashima |
| 2004/0073432 A1 | 4/2004 | Stone |

(Continued)

OTHER PUBLICATIONS

Toledo-Bend.com; "Shareware for the Color Blind," Jul. 29, 2008, 3 pages, toledo-bend.com, U.S.A., http://www.toledo-bend.com/colorblind/shareware.html.

(Continued)

*Primary Examiner* — Ebrahim Golabbakhsh (57) ABSTRACT

A wireless communication device receives a menu selection from a user indicating a user preference to receive video with captions instead of audio. The wireless communication device transfers a message indicating the user preference to a wireless communication network. The wireless communication device receives a content selection for the video content from the user and transfers a content request for the video content to the wireless communication network. The wireless communication network obtains and modifies the video content to replace the audio with the captions and transfers the modified video content to the wireless communication device. The wireless communication device displays the modified video content with the captions and without the audio.

20 Claims, 7 Drawing Sheets (56) References Cited

U.S. PATENT DOCUMENTS

| | | |
|---|---|---|
| 2004/0083291 A1 | 4/2004 | Pessi et al. |
| 2004/0143430 A1 | 7/2004 | Said et al. |
| 2005/0042581 A1 | 2/2005 | Oh et al. |
| 2005/0071888 A1* | 3/2005 | Girouard et al. ............ 725/136 |
| 2005/0134800 A1 | 6/2005 | Kim |
| 2005/0270302 A1 | 12/2005 | Weast |
| 2005/0278740 A1 | 12/2005 | Helms |
| 2006/0010240 A1 | 1/2006 | Chuah |
| 2006/0139312 A1 | 6/2006 | Sinclair et al. |
| 2006/0167985 A1 | 7/2006 | Albanese et al. |
| 2006/0189278 A1 | 8/2006 | Scott |
| 2007/0198945 A1 | 8/2007 | Sun et al. |
| 2008/0275993 A1 | 11/2008 | Mohammed et al. |
| 2010/0020234 A1 | 1/2010 | Smith et al. |
| 2011/0225317 A1 | 9/2011 | Balachandran et al. |

OTHER PUBLICATIONS

Charles D. Cranor, et al.; "Enhanced Streaming Services in a Content Distribution Network;" IEEE Internet Computing; Jul./Aug. 2001; pp. 66-75; http://computer.org/internet/.

USPTO Office Action Summary from U.S. Appl. No. 12/042,391 mailed Jan. 19, 2011.

* cited by examiner

COMMUNICATION METHOD AND SYSTEM FOR PROVIDING CONTENT TO A COMMUNICATION DEVICE ACCORDING TO A USER PREFERENCE

RELATED CASES

This patent application is a continuation of U.S. patent application Ser. No. 12/353,421 that was filed on Jan. 14, 2009 and is entitled "COMMUNICATION METHOD AND SYSTEM FOR PROVIDING CONTENT TO A COMMUNICATION DEVICE ACCORDING TO A USER PREFERENCE." U.S. patent application Ser. No. 12/353,421 is hereby incorporated by reference into this patent application.

TECHNICAL BACKGROUND

Customers typically use mobile devices, such as mobile phones, media devices, and personal computers, to gain mobile access to mobile content such as video, internet, and mobile TV. Providing mobile access to content requires the coordination of many various networks, links, and equipment. Typically, communication carriers provide this access between mobile devices operated by their customers and content providers that provide the desired content. The delivery of mobile content to mobile devices requires the use of network resources. When a large number of mobile devices desire mobile content simultaneously the demand on the network resources may cause a decrease in the overall service delivered to those mobile devices.

OVERVIEW

A wireless communication device receives a menu selection from a user indicating a user preference to receive video with captions instead of audio. The wireless communication device transfers a message indicating the user preference to a wireless communication network. The wireless communication device receives a content selection for the video content from the user and transfers a content request for the video content to the wireless communication network. The wireless communication network obtains and modifies the video content to replace the audio with the captions and transfers the modified video content to the wireless communication device. The wireless communication device displays the modified video content with the captions and without the audio.

DETAILED DESCRIPTION

Figure 1:
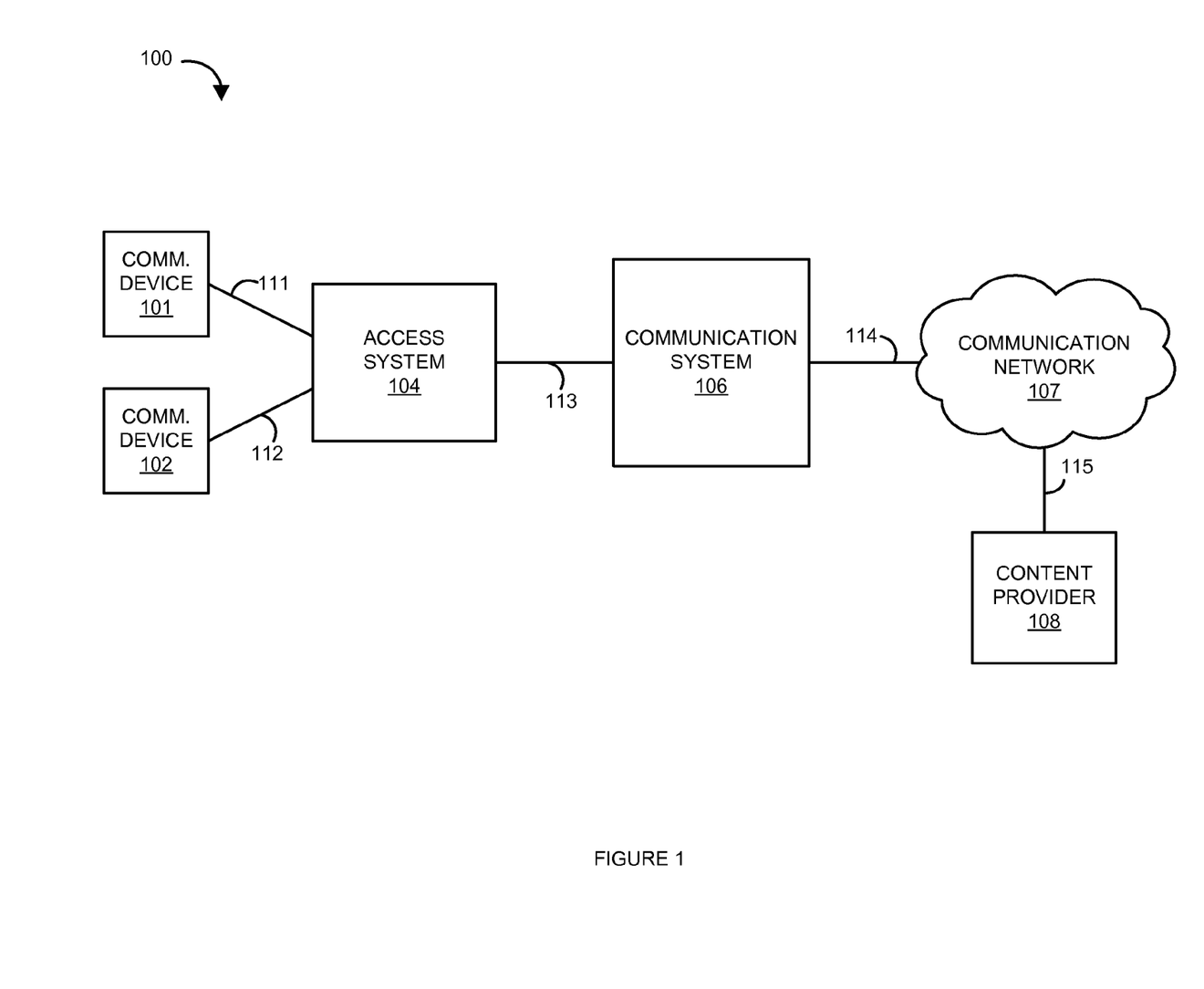
FIG. 1 is a block diagram illustrating a communication system.

FIG. 1 illustrates communication system 100. Communication system 100 includes communication devices 101 and 102, access system 104, communication system 106, communication network 107, and content provider 108. Communication device 101 communicates with access system 104 over communication link 111. Communication device 102 communicates with access system 104 over communication link 112. Access system 104 communicates with communication system 106 over communication link 113. Communication system 106 communicates with communication network 107 over communication link 114. Communication network 107 communicates with content provider 108 over communication link 115. Thus, communication devices 101 and 102 receive content from content provider 108 over the links and paths described above.

Communication devices 101 and 102 comprise mobile phones, personal computers, laptops, personal digital assistants, pagers, or other communication devices. Communication devices 101 and 102 communicate with access system 104 over communication links 111 and 112, respectively.

Access system 104 comprises a base station, base transceiver station, a modem, or other access system. Access system 104 may include a number of elements known to those skilled in the art comprising various combinations and variations of transceivers, power amplifiers, combiners, duplexers, antennas, and control functions. Access system 104 communicates with communication devices 101 and 102 over communication link 111 and 112, respectively. Additionally, access system 104 communicates with communication system 106 over communication link 113.

Communication system 106 comprises a mobile switching center, base station controller, access service node, or any other type, combination, or variation of communication system. Communication system 106 may include a number of elements known to those skilled in the art comprising various combinations and variations of individual communications networks, transmission systems, relay stations, tributary stations, and data terminal equipment usually capable of interconnection and interoperation to form an integrated whole. Communication system 106 communicates with access system 104 over communication link 113. Also, communication system 106 communicates with communication network 107 over communication link 114.

Communication network 107 comprises an internet, an Ethernet, a wide area network, a local area network, a public switched telephone network, or any combination or variation of communication networks. Communication network 107 communicates with communication system 106 over communication link 114. Additionally, communication network 107 communicates with content provider 108 over communication link 115.

Content provider 108 comprises video providers, audio providers, image providers, multimedia providers, or other content providers. Content provider 108 communicates with communication network 107 over communication link 115.

Communication links 111-115 comprise wired links, wireless links, or any combination or variation thereof. Communication link 111 carries communication signals between communication device 101 and access system 104. Communication link 112 carries communication signals between communication device 102 and access system 104. Communication link 113 carries communication signals between access system 104 and communication system 106. Communication link 114 carries communication signals between communication system 106 and communication network 107. Communication link 115 carries communication signals between communication network 107 and content provider 108.

In operation, users operate communication devices 101 and 102 to communicate with content provider 108. For example, users may operate communication device 101 to obtain content from content provider 108 through communication system 106. The content could comprise video, audio, image, or data, as well as other types of data.

Figure 2:
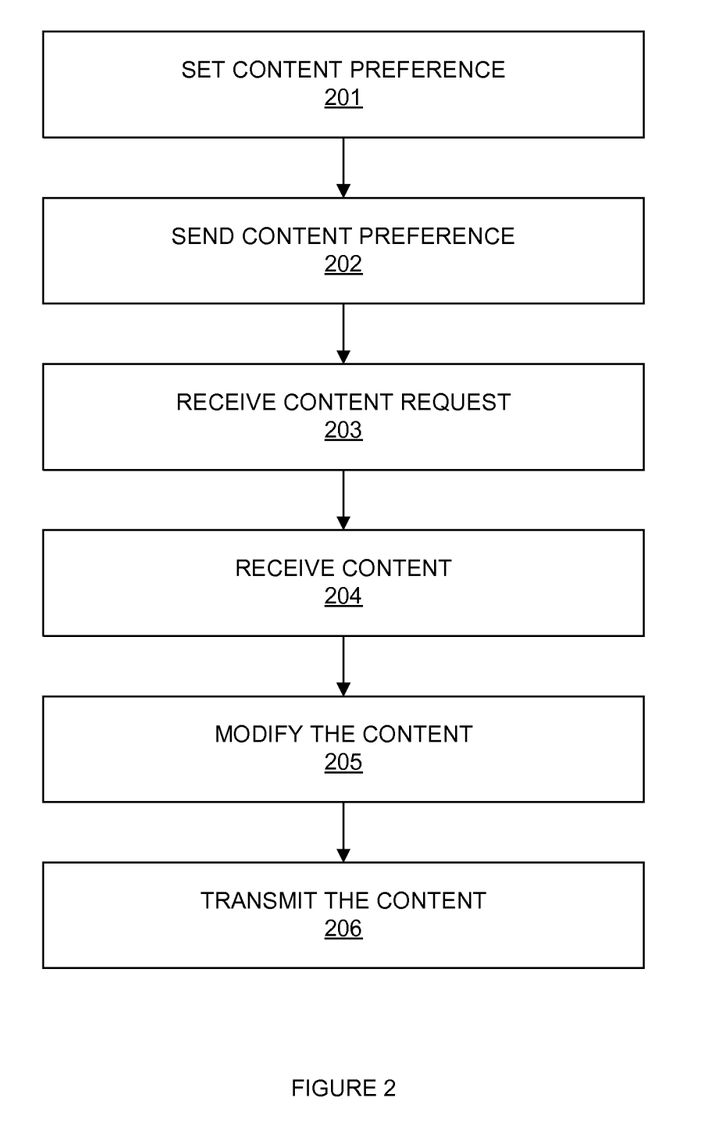
FIG. 2 illustrates a process for the operation of a communication system.

FIG. 2 illustrates a process for the operation of a communication system such as communication system 100. In step 201 a user using communication device 101 sets a content preference on communication device 101. For example, a user may wish to browse the Internet using his/her mobile phone. However, the user may be hearing impaired and as such does not need the audio associated with the web page. The user can enter the browser menu and set the user preference for a hearing impaired user. Additionally, the user may have the choice of choosing between having the audio removed or having captions included with the web page. In another example, the user may be color blind and as such does not need the color images associated with the web page. Accordingly, the color blind user can set the user preference for a color blind user.

In step 202 the previously selected content preference is sent from communication device 101 to communication system 106. Alternatively, the content preference may be sent from communication device 101 to communication system 106 when communication device 101 requests content from communication system 106. In step 203 at some later time communication system 106 receives a content request from communication device 101. Subsequently, communication system 106 forwards the content request to content provider 108. In step 204 communication system 106 receives the content from content provider 108. Alternatively, communication system 106 may pre-cache content from content provider 108 and, thus, would not need to forward the content request from communication device 101.

In step 205 communication system 106 modifies the content received from content provider 108. For example, if the content preference indicates that the user wishes to receive a web page without audio, then communication system 106 modifies the content to remove the audio. Likewise, if the content preference indicates that the user wishes to receive a web page without audio but with captions, then communication system 106 modifies the content to remove the audio and insert captions. In another example, if content preference indicates that the user wishes to receive a web page without color, then communication system 106 modifies the content to remove the color. Additionally, the user preference could indicate that the user wishes to receive a higher resolution black-and-white web page instead of the color web page, or the user preference could indicate that the user wishes to receive a black-and-white web page of comparable quality to the color web page. In step 206 communication system 106 transmits the modified content to communication device 101.

Figure 3:
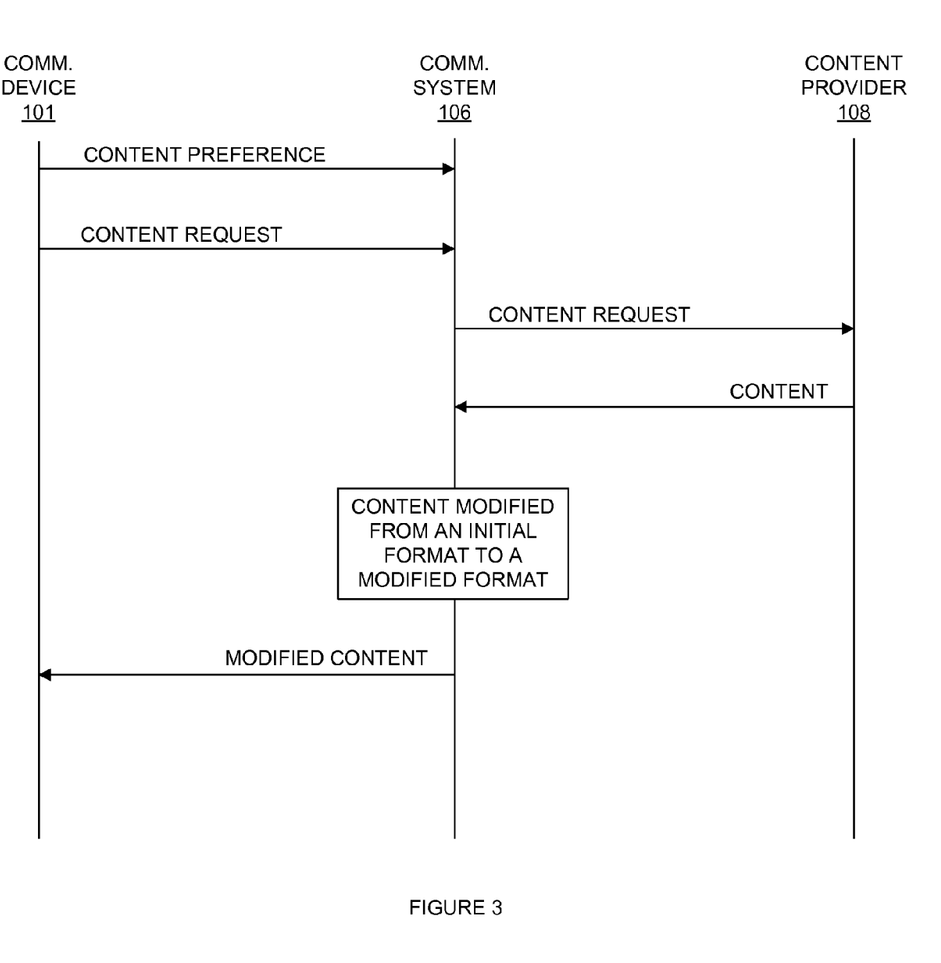
FIG. 3 is a flow diagram that describes modifying content.

FIG. 3 illustrates a flow diagram that describes an example whereby the process as shown in FIG. 2 is employed by communication system 106. In operation, communication device 101 receives content from content provider 108. In this example a user operating communication device 101 is hearing impaired and has changed a setting within his/her mobile phone to indicate that all incoming content to the mobile phone is to be without audio. Additionally, the user may have the ability to specify different content preferences for different types of content. For example, the user may indicate that all web pages viewed on the user's mobile phone are to be sent without audio while also indicating that all mobile TV broadcasts sent to the user's mobile phone are to be sent without audio but with captions. Whatever content preferences the user selects on his/her mobile phone are then sent to communication system 106.

At some later time, the user sends a request to view a web page on his/her mobile phone to communication system 106. This request is then forwarded on to content provider 108, which in response transmits the requested web page to communication system 106. Upon receiving the web page, communication system 106 modifies the web page to remove any audio portions. Communication system 106 then subsequently transmits the modified web page to communication device 101 for the user to view.

Figure 4:
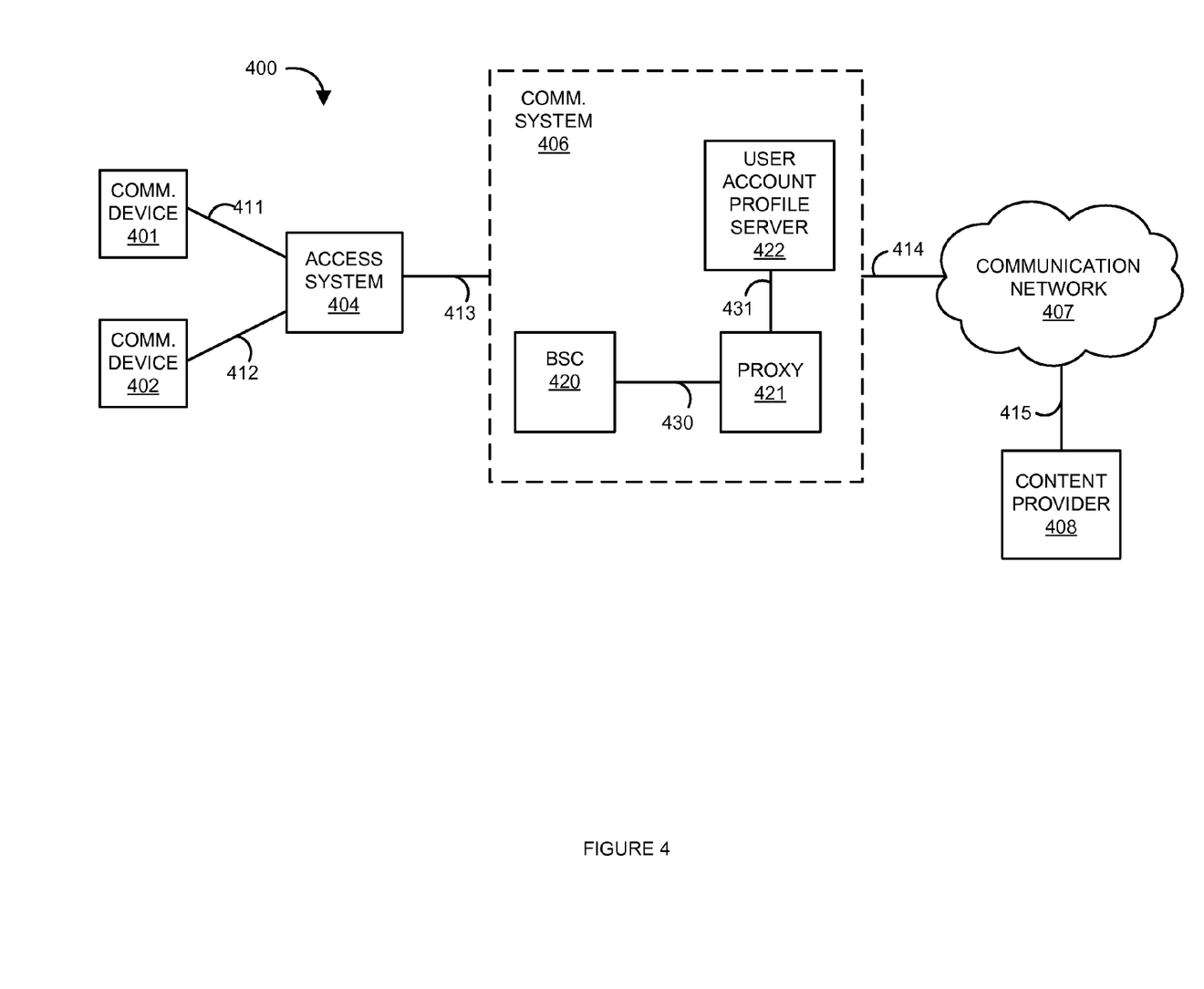
FIG. 4 is a block diagram illustrating a communication system.

FIG. 4 is a block diagram illustrating communication system 400. Communication system 400 includes communication devices 401 and 402, access system 404, communication system 406, communication network 407, and content provider 408. Additionally, communication system 406 includes base station controller 420, proxy 421, and user account profile server 422.

Communication device 401 communicates with access system 404 over communication link 411. Communication device 402 communicates with access system 404 over communication link 412. Access system 404 communicates with communication system 406 over communication link 413. Communication system 406 communicates with communication network 407 over communication link 414. Communication network 407 communicates with content provider 408 over communication link 415. Thus, communication devices 401 and 402 receive content from content provider 408 over the links and paths described above.

Communication devices 401 and 402 comprise mobile phones, personal computers, laptops, personal digital assistants, pagers, or other communication devices. Communication devices 401 and 402 communicate with access system 404 over communication links 111 and 412, respectively.

Access system 404 comprises a base station, base transceiver station, a modem, or other access system. Access system 404 may include a number of elements known to those skilled in the art comprising various combinations and variations of transceivers, power amplifiers, combiners, duplexers, antennas, and control functions. Access system 404 communicates with communication devices 401 and 402 over communication link 411 and 412, respectively. Additionally, access system 404 communicates with communication system 406 over communication link 413.

Communication system 406 comprises a mobile switching center, base station controller, access service node, or any other type, combination, or variation of communication system. Communication system 406 may include a number of elements known to those skilled in the art comprising various combinations and variations of individual communications networks, transmission systems, relay stations, tributary stations, and data terminal equipment usually capable of interconnection and interoperation to form an integrated whole. Communication system 406 communicates with access system 404 over communication link 413. Also, communication system 406 communicates with communication network 407 over communication link 414.

Base station controller 420 comprises processing circuitry and computer elements that supervise the functioning and control of multiple access systems. Furthermore, base station controller 420 handles allocation of radio channels, receives measurements from communication devices 401 and 402, controls handovers, and performs various other functions. Base station controller 420 communicates with proxy 421 over communication link 430.

Proxy 421 comprises a gateway, a router, a switch, or any other type, combination, or variation of communication system. Proxy 421 also performs any modification to content sent from content provider 408 to communication device 401 or 402. Proxy 421 communicates with base station controller 420 over communication link 430 and with user account profile server 422 over communication link 431.

User account profile server 422 contains users' profiles. For example, a user profile is associated with communication device 401 and another user profile is associated with communication device 402. A user profile may indicate that the user wishes the content received by his/her communication device to have a particular format modification. User account profile server 422 communicates with proxy 421 over communication link 431.

Communication network 407 comprises an internet, an Ethernet, a wide area network, a local area network, a public switched telephone network, or any combination or variation of communication networks. Communication network 407 communicates with communication system 406 over communication link 414. Additionally, communication network 407 communicates with content provider 408 over communication link 415.

Content provider 408 comprises video providers, audio providers, image providers, multimedia providers, or other content providers. Content provider 408 communicates with communication network 407 over communication link 415.

Communication links 411-415, 430, and 431 comprise wired links, wireless links, or any combination or variation thereof. Communication link 411 carries communication signals between communication device 401 and access system 404. Communication link 412 carries communication signals between communication device 402 and access system 404. Communication link 413 carries communication signals between access system 404 and communication system 406. Communication link 414 carries communication signals between communication system 406 and communication network 407. Communication link 415 carries communication signals between communication network 407 and content provider 408. Communication link 430 carries communication signals between base station controller 420 and proxy 421. Communication link 431 carries communication signals between user account profile server 422 and proxy 421.

In operation, users operate communication devices 401 and 402 to communicate with content provider 408. For example, users may operate communication device 401 to obtain content from content provider 408 through communication system 406. The content could comprise video, audio, image, or data, as well as other types of data.

Figure 5:
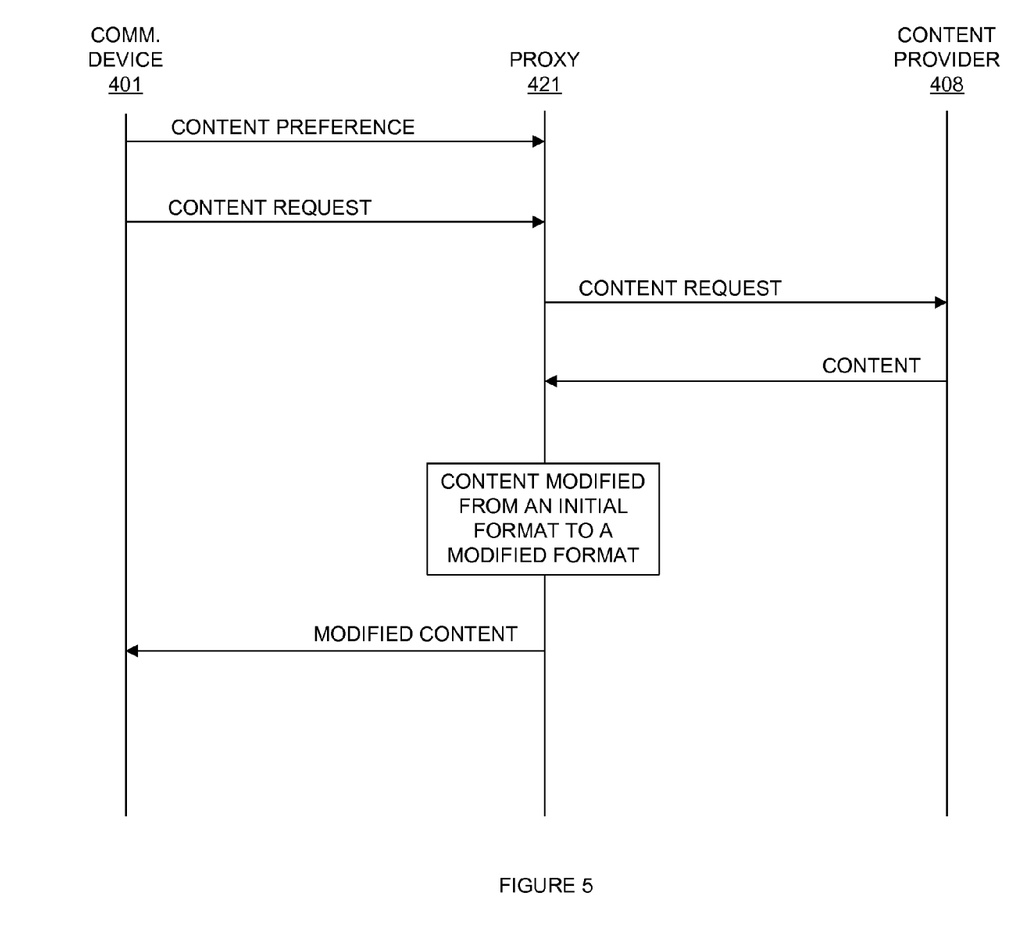
FIG. 5 is a flow diagram that describes modifying content.

FIG. 5 illustrates a flow diagram that describes an example whereby the process as shown in FIG. 2 is employed by communication system 406. In operation, communication device 401 receives content from content provider 408. In this example a user operating communication device 401 is hearing impaired and has changed a setting within his/her mobile phone to indicate that all incoming mobile TV content to the mobile phone is to be captioned. Communication device 401 sends the user's content preference to proxy 421.

At some later time, the user sends a request to view mobile TV on his/her mobile phone to proxy 421. This request is then forwarded on to content provider 408, which in response transmits the requested mobile TV to proxy 421. Upon receiving the mobile TV, proxy 421 modifies the mobile TV to include captioning. Proxy 421 then subsequently transmits the modified mobile TV to communication device 401 for the user to view.

In another example, the mobile TV provided by content provider 408 could be pre-cached on proxy 421. In that case, only communication device 401 and proxy 421 would communicate to provide communication device 401 with mobile TV. Communication device 401 and proxy 421 could communicate using Real Time Streaming Protocol (RTSP).

Communication device 401 would send a RTSP DESCRIBE request to proxy 421. Proxy 421 would respond with a RTSP 200 OK response. Communication device 401 would transmit a RTSP SET_PARAMETER STREAM_REFERENCE: CAPTION_REQUIRED message. Alternatively, communication device 401 could transmit a NO_AUDIO or a B&W_STREAM message to proxy 421. In response, proxy 421 would again send a RTSP 200 OK response. Communication device 401 would then send a RTSP SETUP message to proxy 421. Alternatively, communication device 401 could send multiple RTSP SETUP messages if more than one parameter had been set. For example, the user could indicate that he/she wanted no audio and captioning. Next, proxy 421 would send a RTSP 200 OK response. Proxy 421 would then check the user's preference information based on the supplied parameter set and then prepares the stream accordingly. Proxy 421 then streams the mobile TV using RTSP. Communication device 401 sends proxy 421 a RTSP TEARDOWN message and proxy 421 responds with a RTSP OK message.

Figure 6:
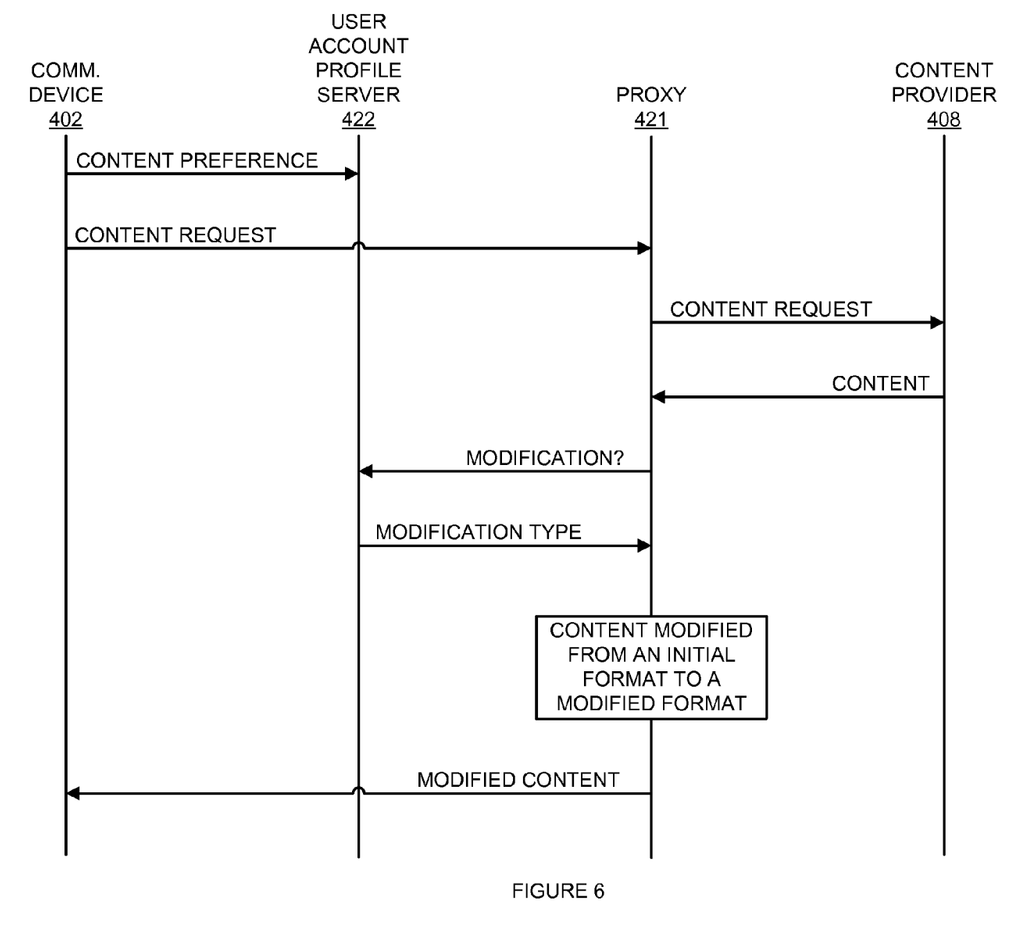
FIG. 6 is a flow diagram that describes modifying content.

FIG. 6 illustrates a flow diagram that describes another example whereby the process as shown in FIG. 2 is employed by communication system 406. In operation, communication device 402 receives content from content provider 408. In this example a user operating communication device 402 is color blind and has changed a setting within his/her mobile phone to indicate that all incoming content to the mobile phone is to be in black and white. Communication device 402 sends the user's content preference to user account profile server 422.

At some later time, the user sends a request to view a web page on his/her mobile phone to proxy 421. This request is then forwarded on to content provider 408, which in response transmits the requested web page to proxy 421. Upon receiving the web page, proxy 421 queries user account profile server 422 to see if the web page from content provider 408 is to be modified. User account profile server 422 sends a response to proxy 421 identifying that the web page is to be modified to replace all color images with black and white images. In response, proxy 421 modifies the web page to replace any color images with black and white images. Proxy 421 then subsequently transmits the modified web page to communication device 402 for the user to view.

Figure 7:
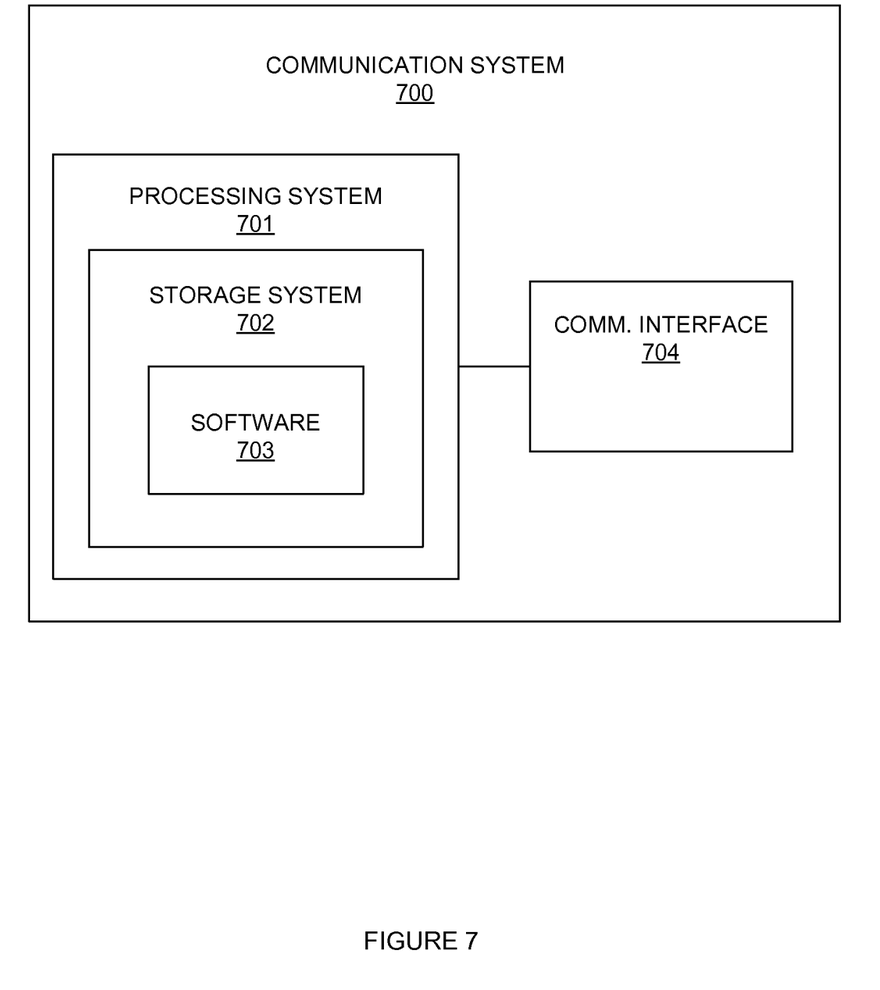
FIG. 7 is a block diagram illustrating a communication system.

FIG. 7 is a block diagram illustrating communication system 700. Communication system 700 could be a communication system similar to communication system 106, communication system 606, or some other similar communication system. Communication system 700 includes communication interface 704 and processing system 701. Processing system 701 includes storage system 702. Storage system 702 stores software 703. Processing system 701 is linked to communication interface 704. Communication system 700 could be comprised of a programmed general-purpose computer, although those skilled in the art will appreciate that programmable or special purpose circuitry and equipment may be used. Communication system 700 may be distributed among multiple devices that together comprise elements 701-704.

Communication interface 704 could comprise a network interface, modem, port, transceiver, or some other communication device. Communication interface 704 may be distributed among multiple communication devices. Processing system 701 could comprise a computer microprocessor, logic circuit, or some other processing device. Processing system 701 may be distributed among multiple processing devices. Storage system 702 could comprise a disk, tape, integrated circuit, server, or some other memory device. Storage system 702 may be distributed among multiple memory devices.

Processing system 701 retrieves and executes software 703 from storage system 702. Software 703 may comprise an operating system, utilities, drivers, networking software, and other software typically loaded onto a computer system. Software 703 could comprise an application program, firmware, or some other form of machine-readable processing instructions. When executed by processing system 701, software 703 directs processing system 701 to operate as described herein.

Note, communication systems 100 and 400 allow for a way to detect for a user's disability and to subsequently enhance the user's experience by modifying any content that is received on the user's communication device. Such modification allows for the saving of network resources by not sending extraneous information to users who may have a disability that would preclude them from experiencing that information. For example, a hearing impaired user would not need the audio associated with a web page and network resources that would have been allocated to sending the audio can be used elsewhere within the network. Additionally, such modification would enhance the user's experience. For example, a hearing impaired user would have their user experience enhanced by the addition of caption to a mobile TV broadcast.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to modify video content for a wireless communication device, the method comprising:
   in the wireless communication device, receiving a menu selection from a user indicating a user preference to receive video with captions instead of audio and transferring a message indicating the user preference to a wireless communication network;
   in the wireless communication network, receiving the message indicating the user preference to receive the video with the captions instead of the audio;
   in the wireless communication device, receiving a content selection for the video content from the user and transferring a content request for the video content to the wireless communication network;
   in the wireless communication network, receiving the content request and responsively obtaining the video content, modifying the video content to replace the audio with the captions, and transferring the modified video content to the wireless communication device;
   in the wireless communication device, displaying the modified video content with the captions and without the audio.

2. The method of claim 1 wherein, in the wireless communication device, receiving the menu selection from the user indicating the user preference to receive the video with the captions instead of the audio comprises receiving a browser menu selection.

3. The method of claim 1 wherein, in the wireless communication device, transferring the message indicating the user preference to the wireless communication network comprises transferring a Real Time Streaming Protocol (RTSP) message.

4. The method of claim 1 wherein, in the wireless communication device, receiving the content selection for the video content from the user comprises receiving a request for a web page including the video content.

5. The method of claim 1 wherein, in the wireless communication network, obtaining the video content comprises downloading the video content from a content provider over an internet.

6. The method of claim 1 wherein, in the wireless communication device, transferring the message indicating the user preference to the wireless communication network and transferring the content request for the video content to the wireless communication network comprises transferring the content request with the message.

7. The method of claim 1 wherein, in the wireless communication device, receiving the menu selection from the user indicating the user preference further comprises receiving an instruction to receive the video in a non-color format instead of a color format.

8. The method of claim 1 wherein, in the wireless communication network, modifying the video content further comprises changing the video content from a color format to a non-color format.

9. The method of claim 1 wherein the wireless communication device comprises a mobile phone.

10. The method of claim 1 wherein the wireless communication device comprises a personal computer.

11. A communication system to modify video content for a wireless communication device comprising:
    the wireless communication device configured to receive a menu selection from a user indicating a user preference to receive video with captions instead of audio and transfer a message indicating the user preference to a wireless communication network;
    the wireless communication network configured to receive the message indicating the user preference to receive the video with the captions instead of the audio;
    the wireless communication device configured to receive a content selection for the video content from the user and transfer a content request for the video content to the wireless communication network;
    the wireless communication network configured to receive the content request and responsively obtain the video content, modify the video content to replace the audio with the captions, and transfer the modified video content to the wireless communication device;
    the wireless communication device configured to display the modified video content with the captions and without the audio.

12. The communication system of claim 11 wherein, in the wireless communication device, receiving the menu selection from the user indicating the user preference to receive the video with the captions instead of the audio comprises receiving a browser menu selection.

13. The communication system of claim 11 wherein the wireless communication device is configured to transfer the message indicating the user preference to the wireless communication network in a Real Time Streaming Protocol (RTSP) message.

14. The communication system of claim 11 wherein the wireless communication device is configured to receive the content selection from the user in a request for a web page including the video content.

15. The communication system of claim 11 wherein the wireless communication network is configured to download the video content from a content provider over an internet.

16. The communication system of claim 11 wherein the wireless communication device is configured to transfer the content request for the video content to the wireless communication network along with the message indicating the user preference.

17. The communication system of claim 11 wherein the wireless communication device is configured to receiving the menu selection from the user indicating the user preference including an instruction to receive the video in a non-color format instead of a color format.

18. The communication system of claim 11 wherein the wireless communication network is configured to change the video content from a color format to a non-color format.

19. The communication system of claim 11 wherein the wireless communication device comprises a mobile phone.

20. The communication system of claim 11 wherein the wireless communication device comprises a personal computer.

* * * * *